Feb. 1, 1955 W. H. HAWKINS 2,701,069
AUTOMOBILE TOW TRAILER
Filed Dec. 28, 1951 4 Sheets-Sheet 1

INVENTOR
WALLACE H. HAWKINS,
BY
ATTORNEY

Feb. 1, 1955  W. H. HAWKINS  2,701,069
AUTOMOBILE TOW TRAILER

Filed Dec. 28, 1951  4 Sheets-Sheet 2

INVENTOR
WALLACE H. HAWKINS,

BY *J. Harold Kilcoyne*

ATTORNEY

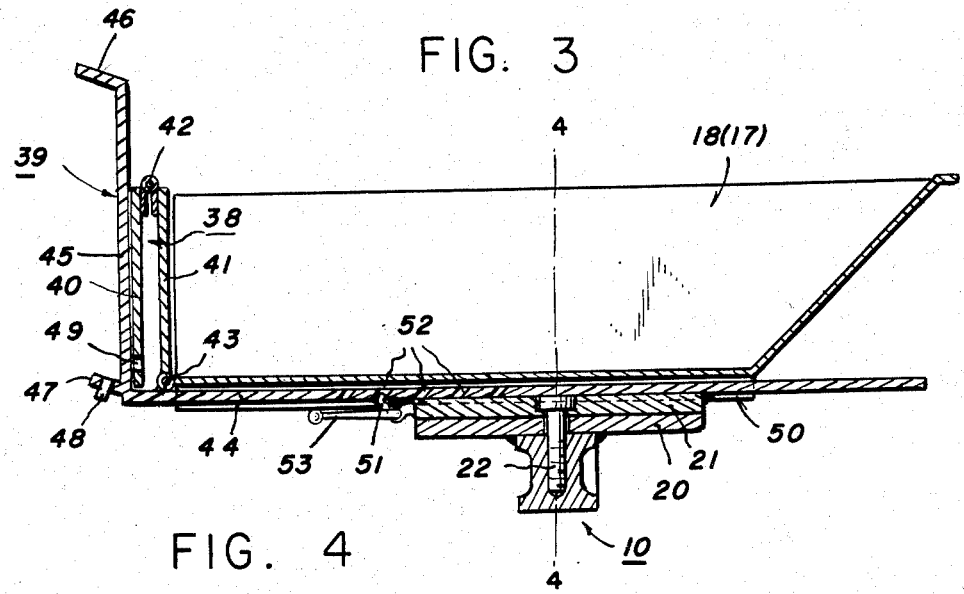
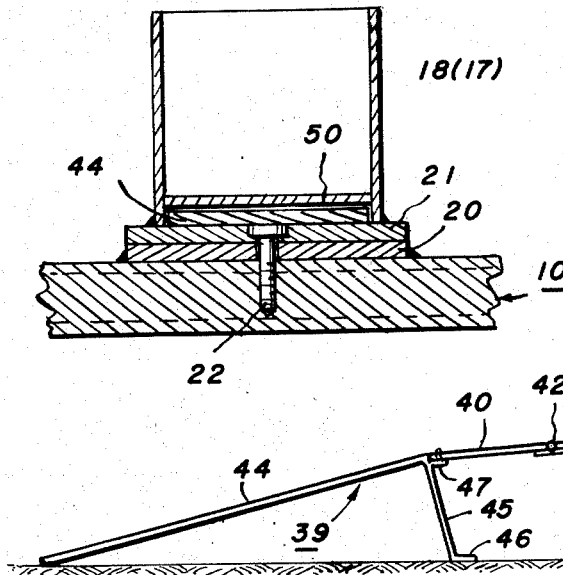
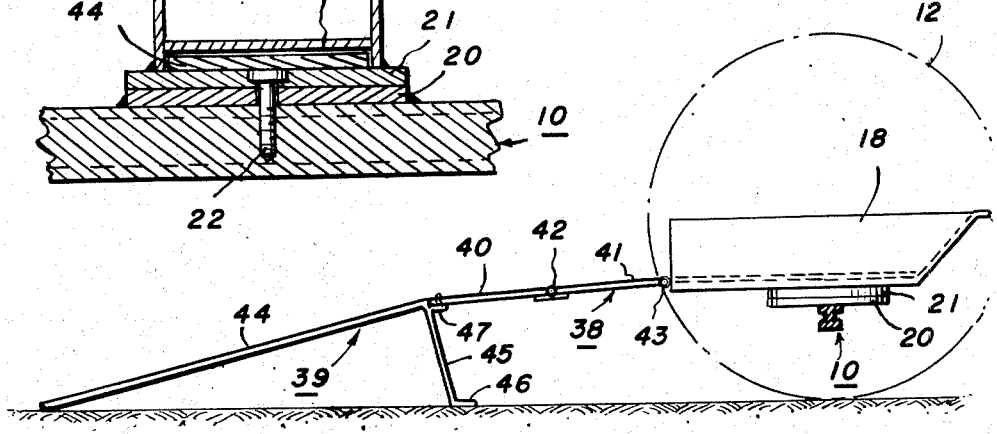
INVENTOR
WALLACE H. HAWKINS,
BY
ATTORNEY

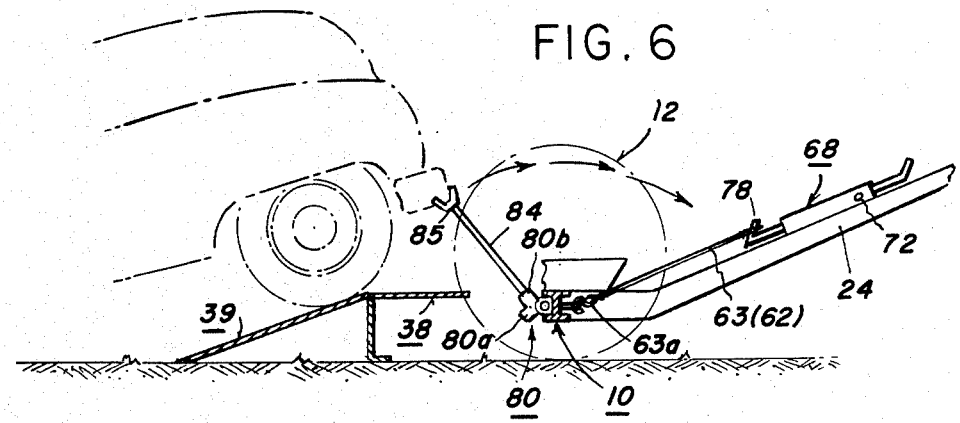
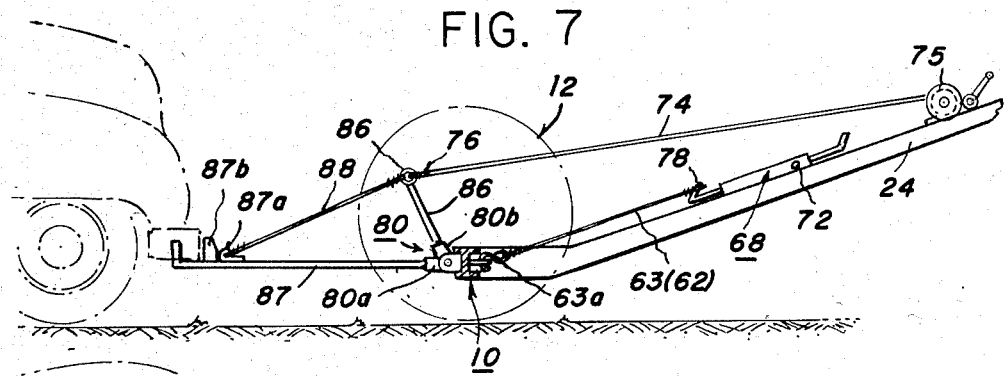
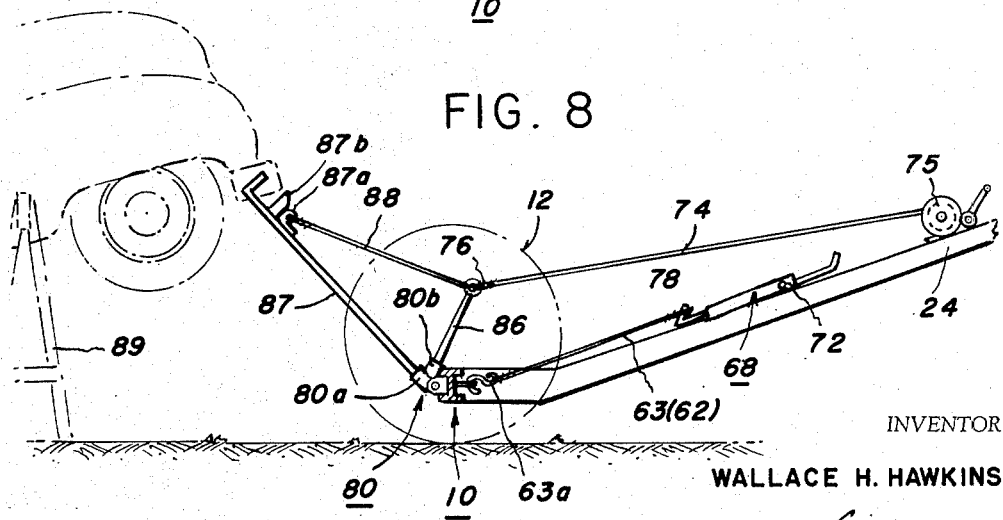

United States Patent Office 2,701,069
Patented Feb. 1, 1955

2,701,069

AUTOMOBILE TOW TRAILER

Wallace H. Hawkins, Panama City, Fla.

Application December 28, 1951, Serial No. 263,718

14 Claims. (Cl. 214—86)

This invention relates to improvements in automobile tow trailers of the general class disclosed in my Patent No. 2,541,582, dated February 13, 1951.

While admirably suited to the type of service for which it was designed, namely, long-distance towing of automobiles, racing cars and like vehicles at high speeds, a tow trailer according to my aforesaid patent is not adapted to perform other types of towing service, for example, the towing of wrecked or crashed automobiles whose front (or rear) wheels may be so damaged as to be incapable of being accommodated in and supported by the trailer cradles, nor is my patented trailer equipped with means to load a vehicle on itself as is frequently required in towing of automobiles being repaired or whose engines are out of commission temporarily.

With the above in mind, it is a general object of the present invention to provide an automobile tow trailer capable of giving more flexible service than a tow trailer as disclosed in my aforesaid patent, in that it may be employed not only for long-distance towing but is also suitable for the towing of disabled or wrecked vehicles as well as for general garage and wrecked-car lot use.

More particularly, the invention aims to provide a tow trailer incorporating practical and dependable lift means for loading the front (or rear) end of a disabled or wrecked automobile on to the trailer, as well as for positioning and supporting the same for towing in the usual manner.

Yet another object of the present invention is the provision of a two-wheel tow trailer employing steerable ground wheels and incorporating low-slung cradles for supporting either the front or rear wheels of the vehicle being towed at a minimum of elevation, wherein the cradles are mounted for turning movement about vertical axes independently of the trailer ground wheels, but are nevertheless caused to turn or steer with said ground wheels.

Another feature of the present invention resides in the novel construction and mounting of the cradles as aforesaid for supporting the front (or rear) wheels of an automobile being towed, which enables the cradles to turn with the steerable trailer ground wheels, as with the tow trailer disclosed in my aforesaid patent, so that the towed vehicle may track the service or tractor vehicle and the tow trailer as is required both for high speed towing and for normal speed towing on curved or winding roads, and which also insures that the trailer wheels may be freely turned in steering without bumping the cradles or the wheels of the vehicle being towed.

Another feature of the invention resides in the provision of a tow trailer incorporating cradles for supporting the front (or rear) wheels of the vehicle being towed as aforesaid, and a novel end gate and ramp means serving the double function of assisting the loading operations and thereupon providing a locked closure for the rear ends of the cradles.

A further object of the invention is the provision of demountable lift means for a tow trailer functioning to assist loading of a disabled vehicle thereon as well as the loading of a vehicle capable of being run onto the trailer under its own power, which is characterized by simple yet thoroughly dependable construction and mode of operation, and which moreover can be readily assembled with and disassembled from the tow trailer as and when required.

Other objects and advantages of a tow trailer characterized as in the foregoing will be apparent from the following detailed description, taken with the accompanying drawings, wherein Fig. 1 is a top plan view of the improved tow trailer of the present invention, with the axle supports shown in their lowered or inactive position, the dotted lines indicating the manner in which the cradles turn with the steerable trailer ground wheels;

Fig. 2 is a rear elevational view of the improved tow trailer illustrated in Fig. 1, the righthand axle support being shown in its raised or active position for supporting a disabled car from one of its axles, which is indicated in dotted lines, the lefthand axle support being shown in its inactive position as when towing an undamaged car whose front (or rear) wheels are supported in the trailer cradles, as also indicated in dotted lines;

Fig. 3 is a section taken along line 3—3 of Fig. 1, which illustrates the cradle mounting and the combined end gate and ramp means associated with the cradle;

Fig. 4 is a section taken along line 4—4 of Fig. 3;

Fig. 5 is a side elevation looking on to a cradle which illustrates the combined end gate and ramp means set up to assist in loading a vehicle to be towed on to the trailer;

Fig. 6 illustrates one form of demountable lift means employed in loading a vehicle which is capable of being run on to the trailer under its own power;

Fig. 7 illustrates another form of demountable lift means assembled on the tow trailer according to the invention for use in loading a disabled vehicle on to the trailer; and Fig. 8 is a view illustrating the manner of using the lift means shown in Fig. 7.

Figure 2:
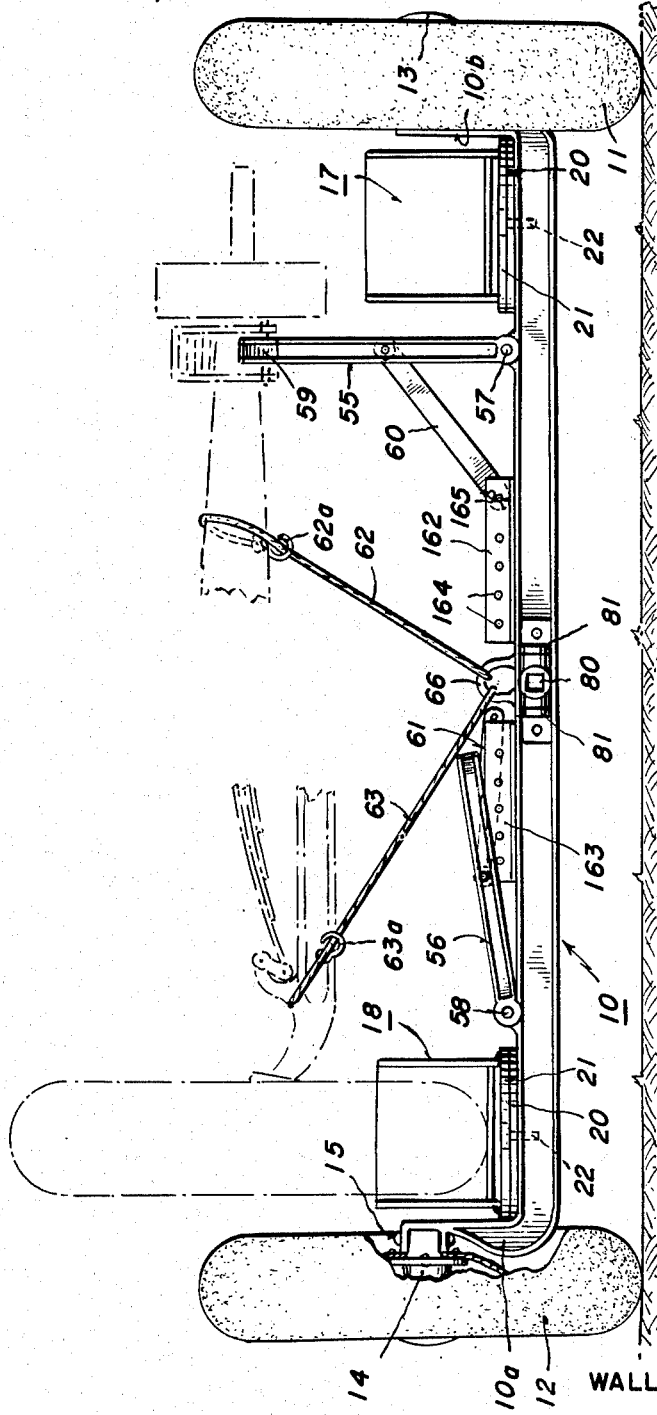

In the drawings, which are to be taken as illustrative of a preferred construction of tow trailer satisfying the aims and purposes of the invention, reference numeral 10 designates a main cross axle supported on ground-engaging wheels 11, 12 turning on stub axles 13, 14. To maintain the center of gravity of the vehicle being towed as low as possible, the main axle 10 has U-form, as shown in Fig. 2, and the upper ends of its upright side arms 10a, 10b are connected to the stub axles 13, 14, respectively, so that its vehicle-supporting cross part is disposed substantially below the common axis of said stub axles. Connection between axle side arms 10a, 10b and stub axles 13, 14 is effected by means of vertical king bolts 15 suitably journaled in the upper ends of the side arms and the inner ends of the stub axles, whereby the ground wheels 11, 12 are steerable.

Mounted on the main axle 10 are cradles 17, 18 for receiving and supporting the front (or rear) wheels of the vehicle to be towed. Said cradles are spaced laterally an amount corresponding to the standard lateral spacing between the wheels of said vehicle, and it will be observed that, due to the close coupling of the cradles to ground wheels 11, 12, the lateral spacing of said ground wheels does not substantially exceed the lateral spacing of the cradles, with the result that the overall width of the tow trailer is kept to a minimum.

It is a feature of the present invention that the cradles 17, 18 are each mounted for turning movement on a vertical axis so that, like the ground wheels 11, 12, the cradles are also steerable. To provide for such turning movement, the cradles, instead of being rigidly affixed to the main axle 10, are each connected thereto by a so-called fifth wheel construction which, by reference to Figs. 3 and 4, illustratively comprises lower and upper bearing plates 20, 21 affixed, respectively, to the axle 10 and to the cradle as by welding, said plates being held in surface engagement by a vertical pivot pin 22 extending therethrough, and preferably into the axle, the arrangement being such fixed thereto, may turn about the axis of pivot pin 22 that the upper bearing plate 21, and hence the cradle affixed while being supported on the lower bearing plate 20.

Figure 1:
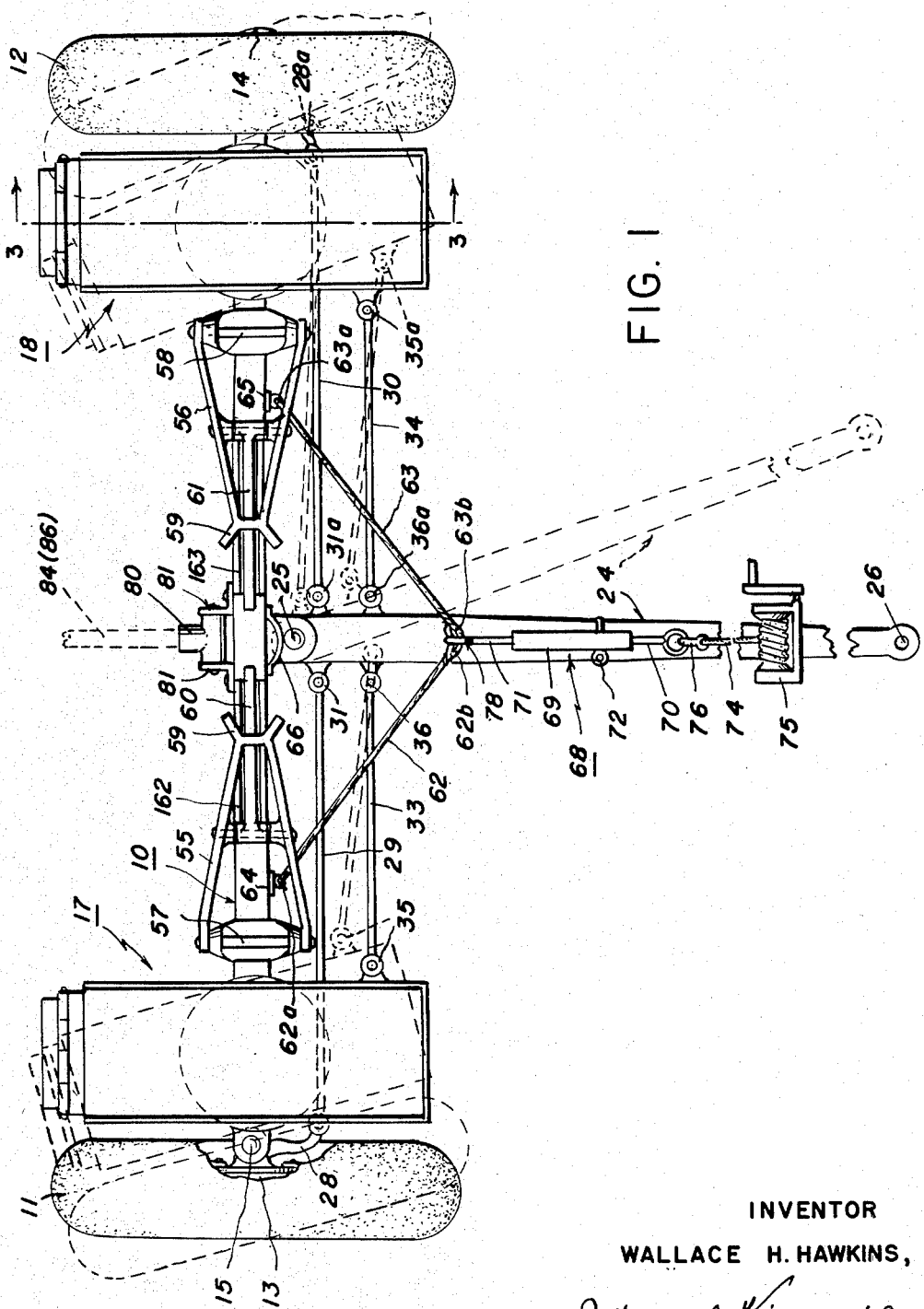

Referring to Fig. 1, a trailer according to the invention is adapted to be drawn by a service or tractor vehicle (not shown), to which it is connected by means of a draft bar or tongue 24 pivotally connected at its rearward end to the mid point of the main axle 10 by a vertical hinge pin 25 and provided at its forward end with any standard hitch 26 for connecting it to the servive vehicle. Fig. 1 also illustrates the connections between the draft tongue 24 and ground wheels 11 and 12 and between said tongue and the cradles 17, 18, whereby both the ground wheels and cradles follow angular movement of the draft tongue, i. e. are steered. The connections between the draft tongue and ground wheels include steering arms 28, 28a fixed as by welding to the stub axles 13, 14 so as to extend laterally from their king pin journal ends, the steering arms being suitably curved so as to be accommodated in the space between the dished hub sections of the ground wheels 11, 12 and the outer side walls of the cradles 17, 18. Drag links 29, 30 connected at their outer ends to the free ends of the steering arms 28, 28a, respectively, extend inwardly to eyes 31, 31a projecting outwardly from the sides of the draft tongue, being connected to said eyes as by vertical connecting pins. The steering connections between the draft tongue 24 and the cradles 17, 18 comprise drag links 33, 34 extending between eyes 35, 35a affixed to and projecting inwardly from the inner side walls of the cradles and eyes 36, 36a projecting outwardly from the sides of the tongue, said drag links being connected to said eyes as by vertical connecting pins. Thus, as the service or tractor vehicle which draws the tow trailer negotiates a curve, and the draft tongue 24 is turned angularly due to the component of horizontal force thereon, the trailer ground wheels 11, 12 turn in similar direction and corresponding amount as the draft tongue, with the result that the trailer tracks the service vehicle around curves or turns. Angular movement of the draft tongue also causes proportional turning movement of the cradles 17, 18 about the axes of the pins 22 of their fifth wheel mountings. Thus, the steerable front wheels of a vehicle being towed, when the latter are supported in the cradles 17, 18, may turn substantially in the same manner as if they were ground-supported, and with the very desirable result that the rear wheels of the towed vehicle tracks both the trailer and the service vehicle in negotiating curves.

Assuming that the vehicle to be towed is in good running order, it is loaded by running it up on to the trailer to a position such that its front wheels are supported in the cradles 17, 18, being blocked from further forward movement by engagement of said wheels with the front walls of the cradles. Such a loading procedure requires that the rear ends of the cradles be open during loading as against the safety requirement that said ends be closed during towing so as to prevent the loaded vehicle from rolling off the trailer, and it also requires that some form of ramp means be provided up which the front wheels of the vehicle may roll into the cradles. It is a further feature of the invention to provide combined end gate and ramp means serving the double function of a ramp during loading and thereupon of providing an end gate for the rear open end of each cradle. Referring to Figs. 3–5, such means is shown to comprise a folding section ramp part and gate member 38 and a fixed section ramp part 39. As seen in Fig. 3, the folding ramp part 38 is made of two sections 40, 41 adapted to fold on one another on the axis of a transverse hinge 42 connecting the same, one section 41 being hinged to the cradle along the bottom line of its rear open end as by a transverse hinge 43. The height and width of the sections 40, 41 correspond to the like dimensions of the cradle end whereby when the sections are folded they form an end gate for the cradle with which they are associated.

The fixed-section ramp part 40 comprises an elongate plate 44 having a leg 45 extending substantially at a right angle from one end thereof, the leg terminating in an inclined foot 46. A ledge 47 projects from the leg 45 a short distance above its junction with the plate 44, the ledge extending in the same direction and at about the same inclination as the foot 46. A plurality of pins 48 project from a face of the ledge 47 for cooperation with apertures 49 formed along the free edge of the foldable ramp section 40 for the purpose which will be later explained.

The plate member 44 of the ramp part 39 is adapted to be slid into a slot 50 extending between the cradle side walls and between the under face of the cradle bottom wall and the upper plate of the fifth wheel mounting thereof. When inserted in said slot, the plate 44, and hence the entire ramp part 39, is adapted to be secured in a desired position of adjustment (which depends on the wheel diameter of the vehicle being towed) as by a latch 51 engaging in one of a longitudinal series of holes 52 provided in the body of said ramp plate. While the details of the latch 51 have not been illustrated, it is to be understood that it is biased as by a spring to its latching position shown in Fig. 3 but may be manually actuated to an unlatching position as by a handle 53.

Normally, said ramp parts 38, 39, when cooperated with a cradle in the manner shown in Fig. 3, function as an end gate which closes the rear open end of the cradle. In such position of the parts, the folding section ramp part is folded on its hinge 42 so that it extends as an upright closure extending between the side walls of the cradle, and said ramp part is moreover backed up and secured against unfolding by the leg 45 of the ramp part 39, which latter is held fast by the latch 51. However, when it is desired to run a vehicle on to the trailer, the latch 51 is actuated to its unlatching position, permitting withdrawal of the ramp part 39 from cradle slot 50 and extension of the folding ramp part 38. As shown in Fig. 5, the ramp part 39 is inverted and placed on the ground surface, and the extended ramp part 38 is cooperated therewith by engaging the free edge of the ramp section 40 on the ledge 47 which provides a seat therefor, the ledge pins 48 passing through the apertures 49 provided in the free edge portion of the ramp section 40 to physically connect the ramp parts. Thus, when set up as aforesaid, the ramp parts 38, 39 provide an inclined track-way, up which the front wheels of the vehicle being loaded may roll into the cradles 17, 18. It will be understood that said ramp parts 38, 39 are designed to be structurally strong enough to withstand the front end weight of the vehicle being towed, and also that the hinge 42 is of the type that limits the extension of the hinge sections 40, 41 of the ramp part 38 to that shown in Fig. 5.

To adapt a tow trailer as described in the foregoing to the towing of temporarily disabled vehicles or vehicles which have been damaged to the extent that their front or rear wheels do not provide stable support therefor when placed in the cradles 17, 18, means are incorporated whereby such a vehicle may be trailer-supported from either end through its axle at that end. Referring to Figs. 1 and 2, such means illustratively comprises a pair of laterally spaced axle supports 55, 56 pivotally connected at their one end to the main axle 10 and inwardly of the cradles 17, 18 by pivot bolts 57, 58, their other ends being formed as concave axle seats 59. Due to their pivotal connection with the main axle 10, the axle supports 55, 56 may be swung from an inactive position in which they overlie the main axle to varying angles of inclination, preferably not exceeding 90, depending on the elevation of the axle seats 59 required for a particular tow job. To secure said axle supports in their raised or active position, strut members 60, 61 are provided, whose outer ends are pivotally connected to the axle supports intermediate the ends of the latter and whose inner ends are shiftably contained in upwardly opening channel members 62, 63 affixed to the main axle 10 as shown. A series of aligned holes 164 are provided in the side walls of each channel 162, 163, and a removable pin 165 passed therethrough and through a hole provided in the inner end of the strut member associated therewith provides an abutment for said inner end. It will thus be seen that by removing the pin 165 the strut members may be shifted along the length of the channels 162, 163 as may be necessary to swing the axle supports 55, 56 to any intermediate inclined position or to its full raised position shown in the right half of Fig. 2. When the axle supports are raised to an active position as aforesaid, either the front or rear axle of the vehicle to be towed may be cooperated with the axle seats 59, whereby the corresponding end of the vehicle is supported from the tow trailer by its raised axle. It will be observed here that when it is desirable or necessary that the tow trailer carry the rear end of the vehicle, the axle supports 55, 56 are employed for supporting the vehicle through its rear axle, in place of the steerable cradles 17, 18, since the rear wheels of the conventional vehicle being towed are not steerable. In such case, it is preferably to remove the rear wheels of the vehicle being towed to avoid the possibility of their interfering with the steering movement of the trailer ground wheels 11, 12.

The invention also provides means to prevent the draft tongue 24 from turning with respect to the axle 10 when the tow trailer is being towed empty and during loading of a vehicle thereon, which means are also employed to lash down a vehicle being towed on the trailer. Referring to Figs. 1 and 2, such means comprise a pair of wire cables 62, 63 provided at their rearward ends with hooks 62a and 63a and at their forward ends with eyes 62b and 63b. Affixed to the axle 10 well outwardly of its mid point is a pair of eye bolts 64, 65, and at its mid point the axle carries an upwardly extending U-bolt 66 providing an eye or bail. Secured against the upper face of the draft tongue 24 is a tension lock generally designated 68 shown to be of the type incorporating a spring (not shown) enclosed within a housing 69, which spring is adapted to be placed under tension upon pull being exerted on one rod-like end member 70 thereof against a load applied to its opposite rod-like end member 71, and to be held under a fixed tension as by a transverse pin 72 operative between the housing 69 and the end member 70. In the illustrated arrangement, pull is applied to the end member 70 by a cable 74 operated by a hand winch 75 also carried by the draft tongue 24 adjacent its hitch 26, the cable terminating in a hook 76 adapted to be passed through an eye 77 formed at the outer end of said end member 70. The opposite end member 71 is provided at its outer (rearward) end with a bill 78 with which the cable eyes 62b, 63b are adapted to be engaged.

When it is desired to secure the draft tongue against turning relative to axle 10, the cables 62, 63 are connected as shown in Fig. 1, that is to say, their end hooks 62a, 63a are engaged with the axle-carried eye bolts 64, 65, the eyes 62b, 63b of the cables are engaged with the bill 78 of the tension lock 68, and the hook 76 of the winch cable is engaged with the eye 77 of said tension lock. Thereupon, with the tension holding pin 72 removed, the winch 75 is operated to place the cables 62, 63 under sufficient tension that they function more or less as rigid equalizing links preventing turning movement of the draft tongue 24 with respect to the axle 10, this tension being maintained by replacing the locking pin 72.

When it is desired to employ the cables 62, 63 as hold-down means serving to lash the vehicle being towed to the trailer, said cables are connected as shown in Fig. 2. That is to say, the cables are looped around the raised axle of the vehicle and secured thereto by their end hooks 62a, 63a. The forward or eye ends of the cables are threaded through the center-point eye 66 and their eyes 62b, 63b are engaged with the bill 78 of the tension-lock device. Thereupon, the cables are drawn tight by operation of the hand winch 75.

As forecasts in the foregoing, trailer-mounted means are also provided for assisting in the loading of a vehicle to be towed on to the trailer, such means being preferably of the demountable type, whereby they may be assembled with the trailer during the loading operation and removed therefrom during normal towing. Preliminary to a description of such means, it is to be noted that, speaking generally, the loading of a vehicle capable of being run on to the trailer under its own power requires only that the bumper and fenders at the trailer-end of the vehicle be raised sufficiently high as to clear the cradle outer-side walls and the trailer-wheel tires. On the other hand, the loading of a vehicle whose engine is out of commission or whose front or rear end is damaged requires that the trailer-end of said vehicle be raised high enough as to permit the trailer to be backed under the raised end of the vehicle.

To adapt the trailer for both such loading operations, it is, in the first instance, provided with a socket member 80 (Figs. 1 and 6-8) extending rearwardly from the mid point of the axle 10, being pivotally mounted in a bracket 81 affixed to the axle so that it may swing in a vertical plane. The socket member 80 is of the duplex type providing two sockets 80a, 80b which are angularly related by an angle shown to be somewhat less than 90°. In loading a vehicle capable of being run on to the trailer under its own power, one end of a lift bar 84 is inserted into the upper socket 80b of the socket member. The other end of the bar is forked as at 85, and the length of the bar is such that its forked end may be engaged under the bumper of the vehicle being loaded upon the front wheels thereof having rolled up the inclined ramp part 39 as generally indicated in Fig. 6. When so engaged, the bar, upon further forward movement of the vehicle towards the trailer, is moved through an ascending arc and, in so doing, lifts the bumper and front fenders of the vehicle to a level such that they clear the cradle side walls and the trailer-wheel tires. The aforesaid lifting action also results in the load of the front end of the vehicle being taken from the front wheels thereof whereby the latter may roll over the ramp part 38 without imposing substantial load thereon. Upon the lift bar 84 moving through the vertical plane and beginning its descending movement, it retracts from the vehicle bumper at about the time that the front wheels of the vehicle arrive at their final or support position within the cradles 17, 18. The lift bar 84 may now be removed, and the vehicle lashed to the trailer by the hold-down cables 62, 63.

For loading a disabled or damaged vehicle on to the trailer, a somewhat different lift means is employed which, by reference to Figs. 7 and 8, comprises a mast 86 and an elevating bar 87. The lower end of the mast 86 is adapted to be inserted into the socket 80b and the forward end of the elevating bar 87 is adapted to be inserted into the socket 80a. At its upper end the mast 86 is provided with an eye 86a, and the elevating bar 87 adjacent its outer (rearward) end is provided with an eye 87a and with an angular lug 87b forming with said end a fork or V-notch. Preferably, a guy wire 88 connects the aforesaid eyes 86a and 87a, and said guy-wire and innerend socket connection of mast and elevating bar results in the elevating bar moving in an ascending arc upon pull being applied to the mast 86. Preferably, such pull is applied by connecting the end hook 76 of the winch cable 74 to the mast eye 86a and thereupon operating the hand winch 75.

The manner of employing the last-described lift means in connection with the loading of a disabled or damaged car will, it is believed, be clear from an analysis of Figs. 7 and 8. In Fig. 7, the elevating bar is lowered so that its forked end may engage under the end of the vehicle to be loaded, for example, under the bumper thereof. Operation of the winch 75 results in the elevating bar 87 moving in an ascending arm, thereby lifting the end of the vehicle with which it is engaged. When the latter has been elevated sufficiently to enable the trailer to be backed under the same, with axle supports 55, 56 raised if the vehicle being loaded is to be supported thereon, stands or jacks 89 are placed under the vehicle so as to maintain the raised end thereof at the required elevation. Thereupon, the elevating bar 87 is lowered, the winch cable disengaged from the mast 86, and both mast and elevating bar uncoupled from the trailer. Upon the trailer being backed under the raised end of the vehicle, the latter is lowered as required to position the front wheels thereof in cradles 17, 18 or the front or rear axle thereof on the seats 59 provided on the raised axle supports 55, 56. In a final operation, the vehicle is lashed to the trailer by the hold-down cables 62, 63 as previously described.

Without further analysis, it will be appreciated that a tow trailer as described is extremely flexible as to the type of service in which it may be used. That is to say, it may be employed for the long-distance towing of automobiles, racing cars and the like in good running order at high speeds as with the trailer of my aforesaid Patent No. 2,451,582. In such an application, the feature of the cradles 17, 18 being turnable with the trailer wheels 13, 14 is of particular merit, since it not only permits the trailer to negotiate turns without its ground wheels bumping or rubbing on either the cradles or the vehicle wheels accommodated therein, but, also, it enables the vehicle being towed to track both the trailer and the service or tractor vehicle by which the trailer is drawn. It is a further feature of the invention that, due to the lowslung mounting of the cradles, the center of gravity of the vehicle being towed is kept low, so that it may be towed around curves at high road speeds without danger of overturning. It will also be noted that the close coupling of trailer wheels and cradles reduces the overall width of the trailer to a minimum, and accordingly the trailer may negotiate the narrow roads found in many localities.

A tow trailer according to the invention may also be employed in general service garage use for towing a vehicle whose running gear is in good order but whose motor is out of commission or under repair, and it may also be employed in place of a tow truck (usually including a crane) for towing wrecked automobiles over the road or about a wrecked-car lot. For both such applications, the demountable lift means as described provides a simple yet effective and thoroughly dependable trailer adjunct for use when needed in loading the disabled or damaged vehicle on to the tow trailer.

The provision of a combined cradle end gate and ramp means as described also represents a practical accessory feature, since the inclusion thereof, together with the aforesaid lift means, makes for a self-contained tow-trailer unit.

As many changes could be made in carrying out the above constructions without departing from the scope of the invention, it is intended that all matter contained in the above description or shown in the accompanying drawings shall be interpreted as illustrative and not in a limiting sense.

I claim:

1. In a vehicle tow trailer of the character described, the combination of an axle member, ground wheels pivotally connected to the axle for steering movement, wheel-supporting cradles supported on said axle member inwardly of the ground wheels and being spaced apart a distance corresponding to the lateral spacing between the wheels of a vehicle to be towed, said axle member having U-form and said cradles being mounted on the cross-part of the axle member so as to have an effective level substantially below the turning axis of said ground wheels, said cradles being each mounted for steering movement, a draft tongue pivotally connected to said axle member, and means for effecting steering movement of said cradles and thereby of steerable wheels supported therein in response to pivotal movement of the draft bar.

2. In a vehicle tow trailer of the character described, the combination of a U-form axle member, ground wheels pivotally connected to the upper ends of the axle side arms for steering movement, wheel-supporting cradles mounted on the cross part of said axle member for steering movement about vertical axes and being spaced apart a distance corresponding to the lateral spacing between the wheels of a vehicle being towed, a draft tongue pivotally connected to the axle member, and steering connections operative between said draft tongue and both the ground wheels and the cradles for effecting steering movement of said ground wheels and said cradles in unison responsively to pivotal movement of the draft bar.

3. In a vehicle tow trailer of the character described, the combination of a U-form axle member, ground wheels pivotally connected to the upper ends of the axle side arms for steering movement, wheel-supporting cradles supported on the cross part of said axle member and being spaced a distance corresponding to the lateral spacing between the wheels of a vehicle being towed, fifth-wheel connections between said cradles and said axle member whereby said cradles may be steered, a draft tongue pivotally connected to said axle member, and steering connections operative between said draft tongue and both the ground wheels and the cradles for effecting steering movement of said ground wheels and said cradles in unison responsively to pivotal movement of the draft tongue.

4. In a vehicle tow trailer of the character described, the combination of an axle member, steerable ground wheels supporting said axle member, said ground wheels being spaced apart a distance not substantially greater than the lateral spacing between the wheels of a vehicle being towed, and normally retracted raisable means carried by said axle member and adapted to be raised to an active position and to engage beneath an axle of said vehicle for supporting an end of said vehicle in raised position from said trailer.

5. A vehicle tow trailer as defined in claim 4, wherein said last means comprise a pair of support arms pivotally connected at their one ends to the axle member adjacent its outer ends for swinging movement from an inactive position in which they overlie said axle member to an active position in which they extend upwardly therefrom, said support arms at their other ends being shaped as concave axle seats, and strut members operative between said support arms and axle member for securing said support arms in their active position.

6. A vehicle tow trailer as defined in claim 4, wherein said last means comprise a pair of support arms pivotally connected at their one ends to the axle member adjacent its outer ends for swinging movement from an inactive position in which they overlie said axle member to various positions of angular elevation with respect thereto, said support arms at their other ends being shaped as concave axle seats, strut members operatively connected to said support arms and axle member for bracing said support arms when elevated, and means for adjusting the points of connection between said strut members and axle member whereby to secure the support arms at a desired angular elevation.

7. In a vehicle tow trailer of the character described, the combination of an axle member, steerable ground wheels supporting the same, wheel-supporting cradles mounted on said axle member and being spaced apart a distance corresponding to the lateral spacing of the wheels of a vehicle to be towed, axle supports carried by said axle member and being engageable with an axle of a vehicle to be towed, a draft tongue pivotally connected at its rearward end to the axle member for horizontal turning movement, and winch and cable means carried by said trailer for securing said draft tongue against turning movement, and being also operative to secure to said trailer both a vehicle having its front wheels supported in said cradles and a vehicle having an axle supported on said axle supports.

8. A vehicle tow trailer as defined in claim 7, wherein said means comprises a winch carried by said draft tongue adjacent its forward end, a tension device carried by said draft tongue rearwardly of and adapted to be placed under tension by said winch, and a pair of cables, the rearward ends of which are adapted to be connected with the axle member adjacent the outer ends thereof and alternatively to be looped over the axle of the vehicle to be towed supported as aforesaid, and whose forward ends converge on one another and engage with said tension device.

9. In a vehicle tow trailer of the character described, the combination of an axle member, steerable ground wheels supporting the same, wheel-supporting cradles mounted on said axle member and being spaced apart a distance corresponding to the lateral spacing of the wheels of a vehicle to be towed, and demountable lift means carried by said axle member and being constructed and arranged so as to engage beneath the front end of a vehicle moving onto said trailer under its own power to lift said end while permitting the wheels supporting said end to roll into said wheel-supporting cradles.

10. A vehicle tow trailer as defined in claim 9, wherein said lift means comprises a rearwardly extending socket member pivotally connected to said axle member for swinging movement in a vertical plane, and a lift bar having one end removably seated in the socket of said socket member and its other end forked so as to be engageable beneath a bumper of said vehicle, the construction and arrangement being such that upon said bar being engaged with the bumper of a vehicle running onto the trailer it is swung forwardly and in an ascending arc and in such movement lifts the end of the vehicle engaged thereby.

11. In a vehicle tow trailer of the character described, the combination of an axle member, steerable ground wheels supporting the same, wheel-supporting cradles mounted on said axle member and being spaced apart a distance corresponding to the lateral spacing of the wheels of a vehicle to be towed, axle supports pivotally connected to said axle member inwardly of said cradles for swinging movement from an inactive position in which they overlie said axle member to a substantially upright active position in which they are adapted to provide support for an axle of the vehicle to be towed, demountable lift means pivotally mounted on said axle member for swinging movement in a forwardly ascending arc and being engageable with an end of said vehicle, and means carried by said trailer for actuating said lift means whereby to raise said vehicle end an amount permitting said trailer to be backed thereunder and to provide support therefor.

12. A vehicle tow trailer as defined in claim 11, wherein said lift means comprises a rearwardly extending socket member pivotally connected to said axle member for turning movement on a horizontal axis, said socket member having a pair of sockets vertically spaced from one another by an acute angle, a mast having one end removably inserted in the upper socket, a rearwardly extending lift bar having one end removably inserted in the lower socket and its other end shaped to provide a fork engageable under a part of the vehicle end to be lifted, and wherein said actuating means comprises a winch carried by the trailer forwardly of said mast, and a lifting cable extending between the winch and the other end of the mast for imparting turning movement to the socket member and thereby swinging movement to the lift bar.

13. In a vehicle tow trailer of the character described, the combination of a two-wheel trailer having a cross axle, wheel cradles mounted on said cross axle and being spaced apart a distance corresponding to the lateral spacing of the wheels of a vehicle to be towed, said cradles having U-section and open rear ends, and coacting folding-section and fixed-section means associated with each said cradle and being operative in one position of assembly therewith to provide a closure for the open end of said cradle and in another position to form an inclined ramp running to said open end.

14. A vehicle tow trailer as set forth in claim 13, wherein said means comprises a folding-section part and a fixed-section part, said folding-section part being hinged to the cradle along the bottom line of its open rear end and having dimensions when folded corresponding to those of said open end, said fixed-section part comprising an elongated plate member, a leg extending substantially at a right angle from one end thereof, said leg terminating in an inclined foot and having a transverse ledge projecting therefrom a short distance from its junction with said plate member and being substantially parallel to said inclined foot, said ledge carrying a pin projecting from its face removed from the inclined foot which is adapted to enter an aperture provided in the free edge of the folding-section part when the latter is extended, and means operative between the cradle and said fixed-section part for releasably locking said part to the cradle and in position such that its plate member is disposed beneath the cradle and its leg is disposed upright and extends across the open rear end of the cradle, the construction and arrangement of said parts being such that in one position of assembly thereof with a cradle said folding-section part closes the rear open end of said cradle and said fixed-section part is cooperated therewith as a closure lock, and that in another position of assembly with said cradle the fixed-section part provides an inclined ramp plate connected to the open end of said cradle by the extended sections of said folding-section part, and with the free edge of said folding-section part resting on said ledge and being connected thereto by the ledge pin.

References Cited in the file of this patent

UNITED STATES PATENTS

| Number | Name | Date |
|---|---|---|
| 1,224,574 | Sessions | May 1, 1917 |
| 1,241,418 | Mosher | Sept. 25, 1917 |
| 1,280,141 | Bonner | Oct. 1, 1918 |
| 1,544,477 | Palotce | June 30, 1925 |
| 1,630,792 | Hahn | May 31, 1927 |
| 1,714,548 | Cline et al. | May 28, 1929 |
| 1,941,400 | Johnson | Dec. 26, 1933 |
| 2,112,201 | Larison | Mar. 22, 1938 |
| 2,370,427 | Sherry | Feb. 27, 1945 |
| 2,391,503 | Page | Dec. 25, 1945 |
| 2,418,567 | Ausherman | Apr. 8, 1947 |
| 2,512,795 | Gurries | June 27, 1950 |
| 2,541,582 | Hawkins | Feb. 13, 1951 |
| 2,551,725 | Christiansen | May 8, 1951 |
| 2,639,926 | Parks | May 26, 1953 |